(12) United States Patent
Oyama et al.

(10) Patent No.: US 6,188,677 B1
(45) Date of Patent: Feb. 13, 2001

(54) TELEPHONE APPARATUS USED FOR COMPUTER NETWORK TELEPHONE SYSTEM

(75) Inventors: Akimasa Oyama, Tokyo; Hidekazu Watanabe; Masahiro Asai, both of Chiba; Kazunori Ozawa, Kanagawa; Nobuhiro Tone, Tokyo, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/766,125

(22) Filed: Dec. 16, 1996

(30) Foreign Application Priority Data

Dec. 19, 1995 (JP) .................................................. 7-348832

(51) Int. Cl.[7] ...................................................... H04L 12/16
(52) U.S. Cl. .......................... 370/271; 370/236; 370/477; 375/249; 379/88.1
(58) Field of Search ..................................... 370/465, 468, 370/477, 236, 231, 271; 714/781; 375/249; 379/88.1

(56) References Cited

U.S. PATENT DOCUMENTS

| | | | |
|---|---|---|---|
| 3,466,398 | * 9/1969 | Fraser et al. | 370/250 |
| 4,100,377 | * 7/1978 | Flanagan | 370/435 |
| 4,501,001 | * 2/1985 | Virupaksha et al. | 375/249 |
| 4,589,130 | * 5/1986 | Galand | 704/229 |
| 4,790,015 | * 12/1988 | Callens et al. | 704/212 |
| 5,115,429 | * 5/1992 | Hluchyj et al. | 370/231 |
| 5,130,993 | * 7/1992 | Gutman et al. | 714/781 |
| 5,241,535 | * 8/1993 | Yoshikawa | 370/394 |
| 5,245,614 | * 9/1993 | Gutman et al. | 370/477 |
| 5,444,707 | * 8/1995 | Cerna et al. | 370/389 |
| 5,835,495 | * 11/1998 | Ferriere | 370/465 |

\* cited by examiner

Primary Examiner—Hassan Kizou
Assistant Examiner—John Pezzlo
(74) Attorney, Agent, or Firm—Jay H. Maioli

(57) ABSTRACT

A telephone apparatus of a telephone system, including at least one server for connecting a plurality of telephone apparatuses connected to a computer network, comprises:

a communication circuit means for processing data to and from said computer network; an audio input means for generating a digital audio signal from input voice; an audio compression means for compressing the audio signal from the audio input means and for supplying the compressed audio signal to the communication circuit means; and a control means for determining a compression rate of the audio compression means in response to information on the ratio of use of the computer network obtained from the server.

4 Claims, 10 Drawing Sheets

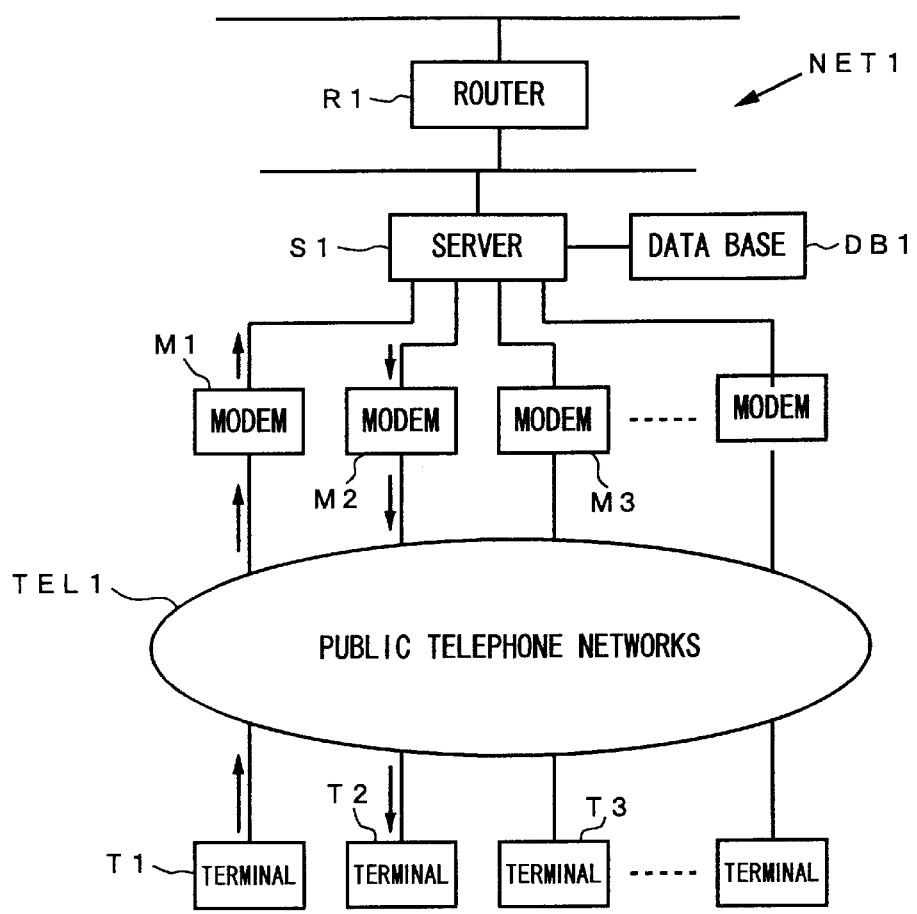

TELEPHONE APPARATUS USED FOR COMPUTER NETWORK TELEPHONE SYSTEM

BACKGROUND OF THE INVENTION

1. Field of the Invention

This invention relates to a telephone system suitable for use as an internet telephone for exchanging audio data through the internet that is a worldwide computer network system.

2. Related Art

The internet is a worldwide computer network system connecting computer networks in corporations or universities beyond countries. Increasingly provided are various services using the internet, such as e-mail service, file transfer service, and information search service.

FIG. 1 schematically shows a general aspect of the internet. In FIG. 1, each of computer networks NET101, NET102, NET103, . . . has a plurality of terminals T which are connected together by LAN (Local Area Network) in form of Ethernet or a token ring.

These computer networks NET101, NET102, NET103, . . . are connected together through routers R101, R102, R103, . . . that route data from a computer network to another, depending on the destination of the data.

Computer networks NET101, NET102, NET103, . . . connected through the routers R101, R102, R103, . . . form a computer network system. The computer network system is called internet. The internet enables exchanges of data among computer networks NET101, NET102, NET103, . . .

The internet uses IP (Internet Protocol) as the protocol of its network layer. IP assigns an IP address to each terminal to identify a destination terminal of data. Each IP address is made up of four numerals each of which can be expressed by decimal 8 bits, such as 43.3.25.246.

As the internet is extended, the number of IP addresses possibly becomes insufficient. In some networks in which a large number of terminals are registered but only a small number of terminals are connected simultaneously, for example, it is possible to use a server on the network to allot currently available IP addresses to actually connected terminals alone in order to minimize the number of IP addresses used. In this manner, the network need not prepare IP addresses in the number corresponding to its terminals, but can effectively use a limited number of IP addresses.

The internet uses TCP (Transmission Control Protocol) and UDP (User Datagram Protocol) as protocols of its transport layer. TCP permits communication after establishing a connection-type transmission connection, and deals with packet sequence control, re-transmission, flow control and congestion control. UDP is a connectionless-type protocol that is used in lieu of TCP in networks requiring real-time transmission. In digital audio transmission, for example, re-transmission is not requested even when a part of packets drops, but audio data is sent successively. In such audio transmission, UDP is used.

Thus, the internet basically uses TCP/IP protocol. That is, IP addresses are assigned to terminals of a computer network to identify individual terminals, and packets are transferred by TCP or UDP.

However, personal computers are not always connected by LAN, and there are some without IP addresses. Therefore, some individuals participating the internet use internet service providers. Through internet service providers, personal computers can be connected to computer networks and can participate the internet by, for example, PPP (Point to Point Protocol) or SLIP (Serial Line IP) through telephone lines.

FIG. 2 shows a construction of an internet service provider. The computer network NET151 of the internet service provider includes a server S151 and a router R151. The server S151 is connected to a public telephone line network TEL151 via modems M151, M152, M153, . . .

Terminals T151, T152, T153, . . . are those of individuals personally participating the internet.

Terminals T151, T152, T153, . . . are connected to the public telephone line-network TEL151 through modems (not shown). Individual terminals T151, T152, T153, . . . may be personal computers having serial ports.

For participation in the internet through an internet service provider, users previously make a contract with an internet service provider in most cases. When a contract is concluded between a user and an internet service provider, an account code and a password are sent to the user.

When an individual participates in the internet from one of the terminals T151, T152, T153, . . . the user dials into the internet service provider to call up the server S151 of the computer network NET151 of the provider. The server S151 responsively requests entry of the account code and the password for authentication whether the user is a contractor. When the server S151 authenticates that the entered account code and password are those of a contractor, it searches for an available IP address. If there is any IP address available, it temporarily assigns it to the terminal T151, T152, T153, or any other. Thus, the terminal obtaining the temporary IP address can connect to the internet.

In the above example, terminals are connected by PPP using telephone lines. However, ISDN (Integrated Service Digital Network) may be used alternatively. ISDN 64 includes three channels, namely, two B channels of 64 kbps and one D channel of 16 kbps. When ISDN is used, it can be used as a line of 64 kbps by sending IP packets on the B channels.

Internet telephones for effecting telephone communication using the internet are now being developed. Since the internet is basically free of charge, what is to be paid by the user for internet telephone communication through the internet is the charge based on the contract with the internet service provider and the charge for the call between the user and the internet service provider or the charge for the use of ISDN. Thus, users can enjoy long-distance telephone calls and international telephone calls very economically.

For a telephone call using the internet, audio data is transmitted in a compressed form. There are various systems for compression, and various sampling frequencies of audio data, such as 8 kHz, 10 kHz, 16 kHz, and so on, are used. As the sampling frequency becomes high, the data amount decreases, but the quality of sound becomes better. Systems using high compression rates are liable to deteriorate the quality of sound.

In a computer network system like the internet, the time for data transmission increases as the network becomes crowded. Therefore, while the network is crowded, it is necessary to use a lower sampling frequency for audio data and to employ a compression system with a higher compression rate in order to prevent that voice is interrupted due to a delay of transmission of the audio data. On the other hand, it is not wise to send audio data with a low sampling frequency and a high compression rate even when the network is not crowded because the quality of sound is not good.

OBJECTS AND SUMMARY OF THE INVENTION

It is therefore an object of the invention to provide a terminal apparatus of a telephone system used as an internet telephone apparatus, which ensures telephone conversation with a high quality of sound with no interruption of voice even when a computer network system is crowded.

According to the invention, there is provide a telephone apparatus of a telephone system, including at least one server for connecting a plurality of telephone apparatuses connected to a computer network, comprising:

a communication circuit means for processing data to and from said computer network; an audio input means for generating a digital audio signal from input voice; an audio compression means for compressing the audio signal from the audio input means and for supplying the compressed audio signal to the communication circuit means; and a control means for determining a compression rate of the audio compression means in response to information on the ratio of use of the computer network obtained from the server.

BRIEF DESCRIPTION OF THE DRAWINGS

FIG. 3 is a block diagram for use in explanation of an internet telephone system to which the invention is applicable;

FIG. 4 is a schematic diagram for use in explanation of an internet telephone system to which the invention is applicable;

DESCRIPTION OF THE PREFERRED EMBODIMENTS

The present invention is applied to an internet telephone for transmitting audio data through the internet, and is especially suitable for use of internet telephones connected by PPP through public telephone networks.

FIG. 3 shows an internet telephone system to which the invention is applicable. In FIG. 3, a computer network NET1 is, for example, a computer network prepared by an internet service provider. The computer network NET1 contains a server S1 and a router R1.

The server S1 is connected to a public telephone network TEL1 through modems M1, M2, M3, . . . Currently, data can be transmitted at the rate of 28.8 kbps through the public telephone network TEL1 by using a high-speed modem.

The computer network NET1 is connected to other computer networks forming the internet through the router R1. The router R1 routes data on the computer network to another computer network containing a destination terminal.

Terminals T1, T2, T3 . . . are those of individuals personally participating the internet. Individual terminals T1, T2, T3, . . . may be personal computers installed with an internet telephone program or exclusive internet telephone sets. Exclusive internet telephone sets are terminals exclusive to internet telephones facilitating telephone communication using the internet as explained later.

The server S1 has a data base DB1. As shown in FIG. 4, the data base DB1 stores "terminal names", "internet names", "connection types", "public phone numbers for PPP", "users' names", and others. The data base DB1 may be established using information obtained from contents of contracts concluded between the internet service provider and users. When the connection type is PPP, the data base DB1 contains telephone numbers for PPP of users contracting with the internet service provider by PPP connection.

Although the terminals T1, T2, T3, . . . are connected to the server S1 by PPP through the public telephone network in the above example, they may be connected through a digital network such as ISDN.

Next explained is a telephone call control in a telephone system. Assume here that a telephone call from the terminal T1 to the terminal T2 is desired in FIG. 3. The internet requires an IP address to specify a destination terminal. In this case, it is possible that the destination terminal T2 to be connected by PPP is not currently connected to the computer network NET1 and cannot be accessed to by using its IP address. To cope with the matter, the data base DB1 is used.

Figure 1:
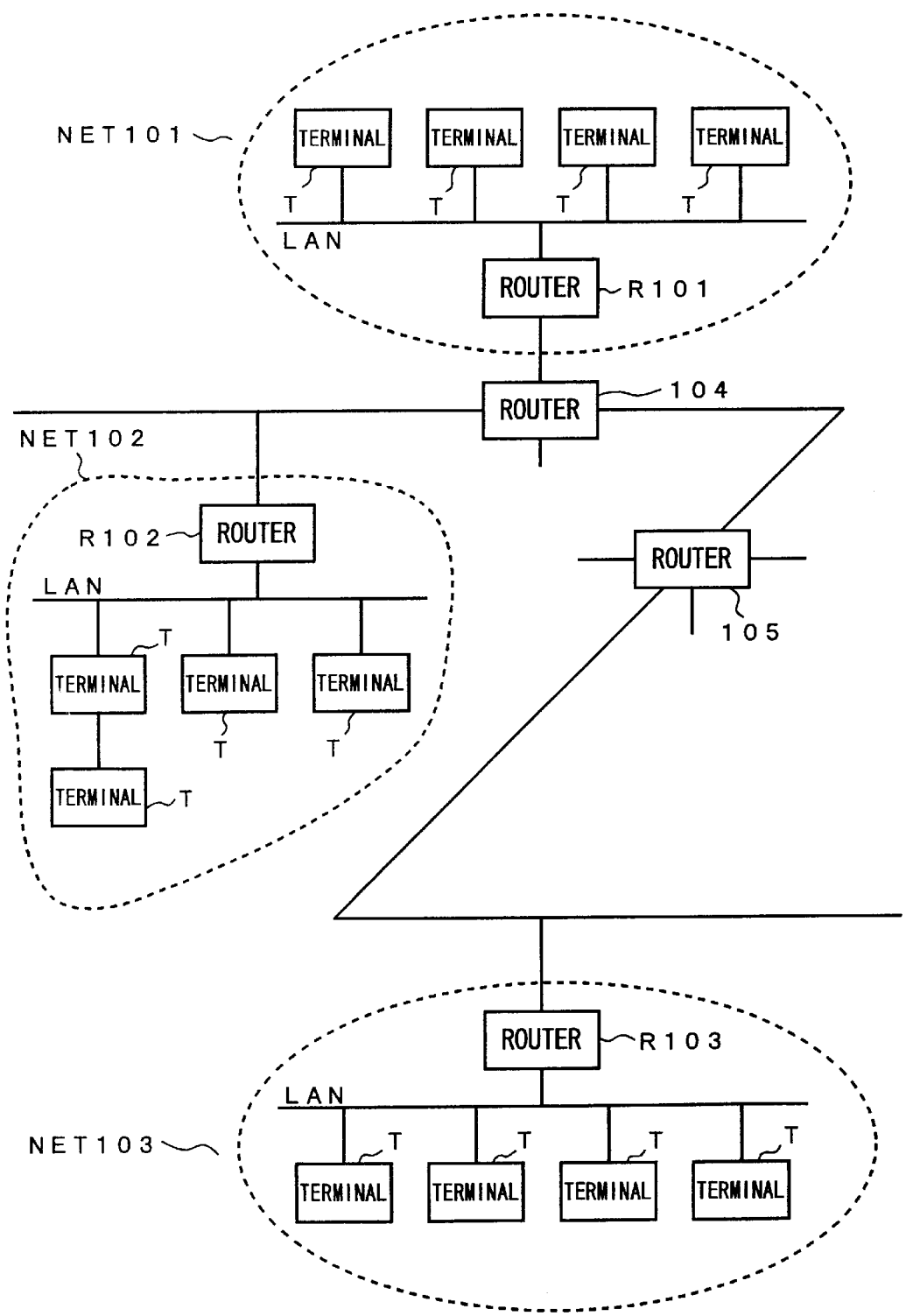
FIG. 1 is a block diagram for use in explanation of the internet.
Figure 2:
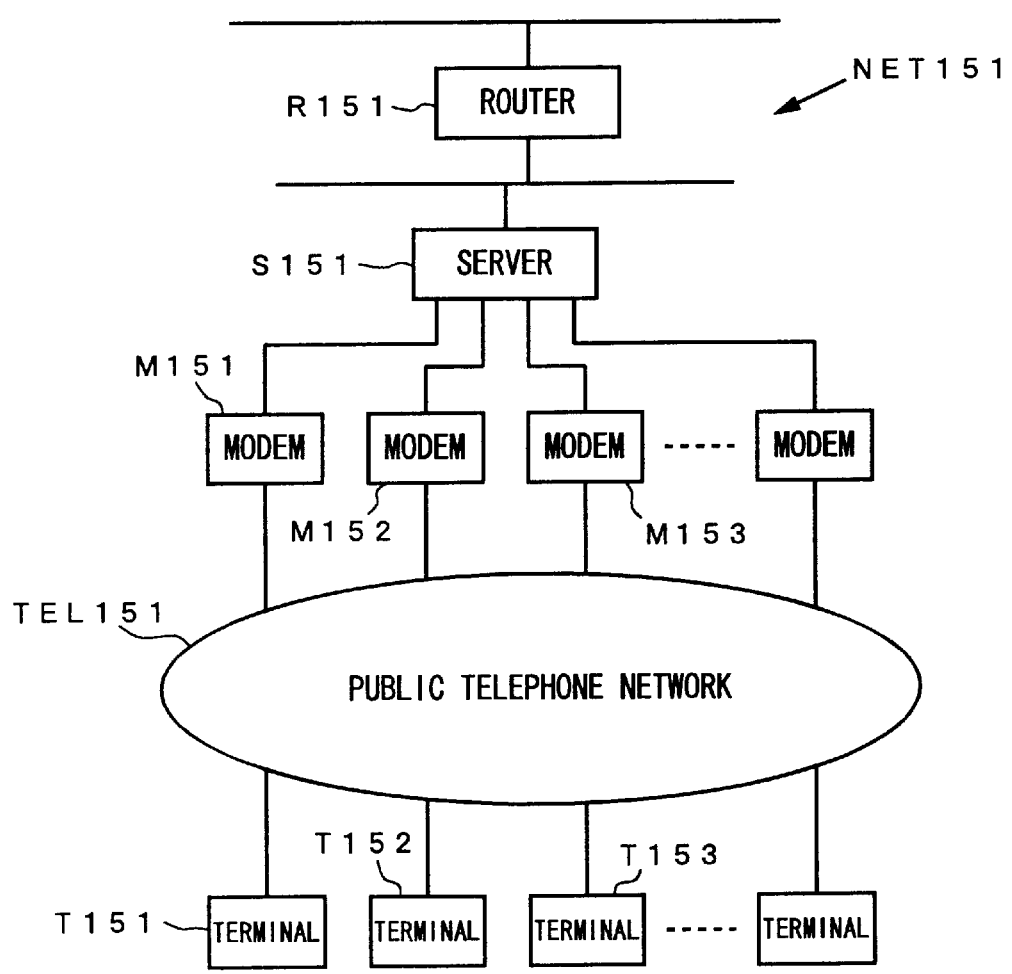
FIG. 2 is a block diagram for use in explanation of PPP connection.
Figure 5:
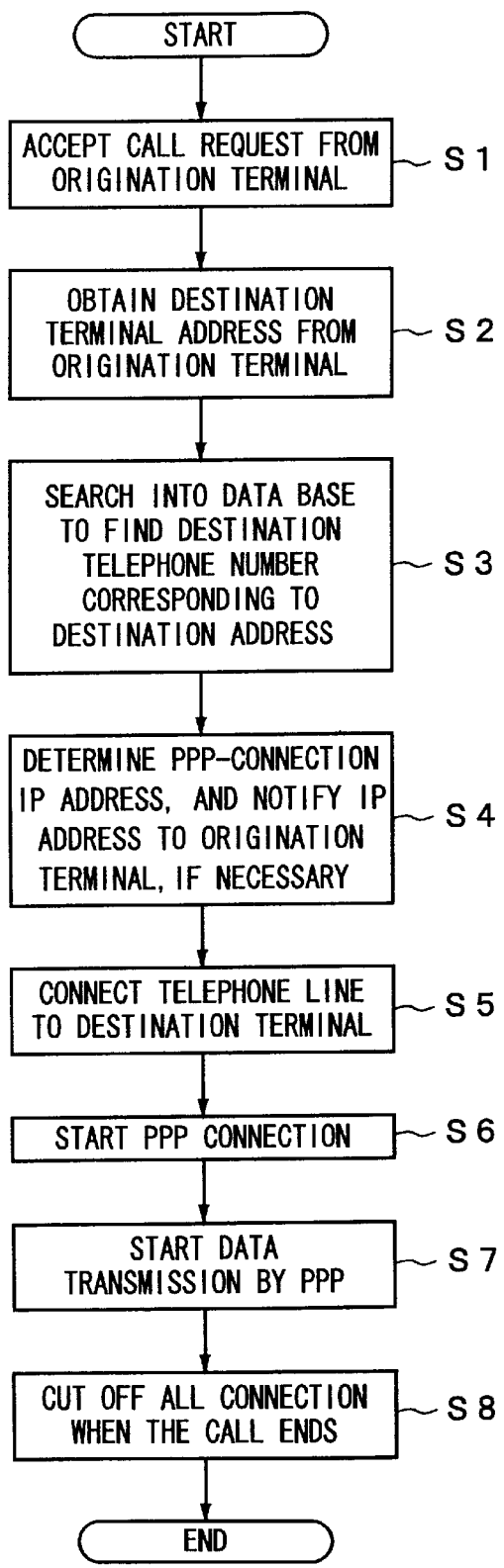
FIG. 5 is a flow chart for use in explanation of an internet telephone system to which the invention is applicable.

FIG. 5 is a flow chart showing the accessing process using the data base DB1. First, the source terminal T1 dials the computer network NET1 of the internet service provider to call up the server S1 of the computer network NET1. Responsively, the server S1 requests the terminal T1 to enter its account code and the password to authenticate whether the source terminal T1 is one of contractors of the internet service provider. The user of the source terminal T1 answers the request by entering its account code and the password. When the server S1 authenticates that the entered account code and password are those of a contractor, it assigns a temporary IP address to the terminal T1. Thus, PPP connection with the terminal T1 is started (step ST1).

After that, the terminal T1 designates a desired destination address (for example, terminal T2) (step ST2).

Responsively, the server S1 searches into the data base DB1 to find out information on the terminal T2 corresponding to the requested destination address. The telephone number of the terminal T2 for PPP connection can be known from information in the data base DB1 (step ST3).

The server S1 subsequently determines an IP address for specifying the destination terminal T2 within the server to prepare for PPP connection, and gives a notice on the destination terminal's IP address to the source terminal T1 (step ST4).

Then, the server S1 dials the telephone number of the terminal T2 found out from the data base DB1 to call up the terminal T2. When connection of the telephone line to the destination terminal T2 is confirmed, the server S1, after authentication, assigns the IP address to the destination terminal (step ST5).

PPP connection is thus started (step ST6). As a result, audio data is exchanged for communication between the terminals T1 and T2 (step ST7). The audio data is transmitted in a compressed form. For exchanging audio data, UDP is used as the protocol of the transport layer.

When the communication ends, all connection including PPP connection and telephone line connection between the terminal T1 and the server S1, those between the terminal T2 and the server S1 is disconnected (step ST8).

Although the above example is configured to determine the IP address of the terminal T2 prior to completing access to the terminal T2, the IP address of the terminal T2 may be determined after the access to the terminal T2 is completed. It is also possible to inform the source terminal T1 of the assigned IP address, if necessary. When the source terminal is informed of the IP address at the time when the server determines the IP address of the destination terminal, the source terminal can prepare for communication with the destination terminal such that the terminals can smoothly proceed to communication.

In this manner, the data base DB1 is provided which stores information on telephone number for PPP connection, and a destination terminal is accessed to through the telephone number obtained from the data base DB1 when the destination terminal is a PPP-connected terminal (T2, for example). Then, the destination terminal T2 is connected to the server S1 by PPP. Therefore, even when the destination terminal is a PPP-connected terminal, the destination terminal can be called up for communication.

Figure 6:
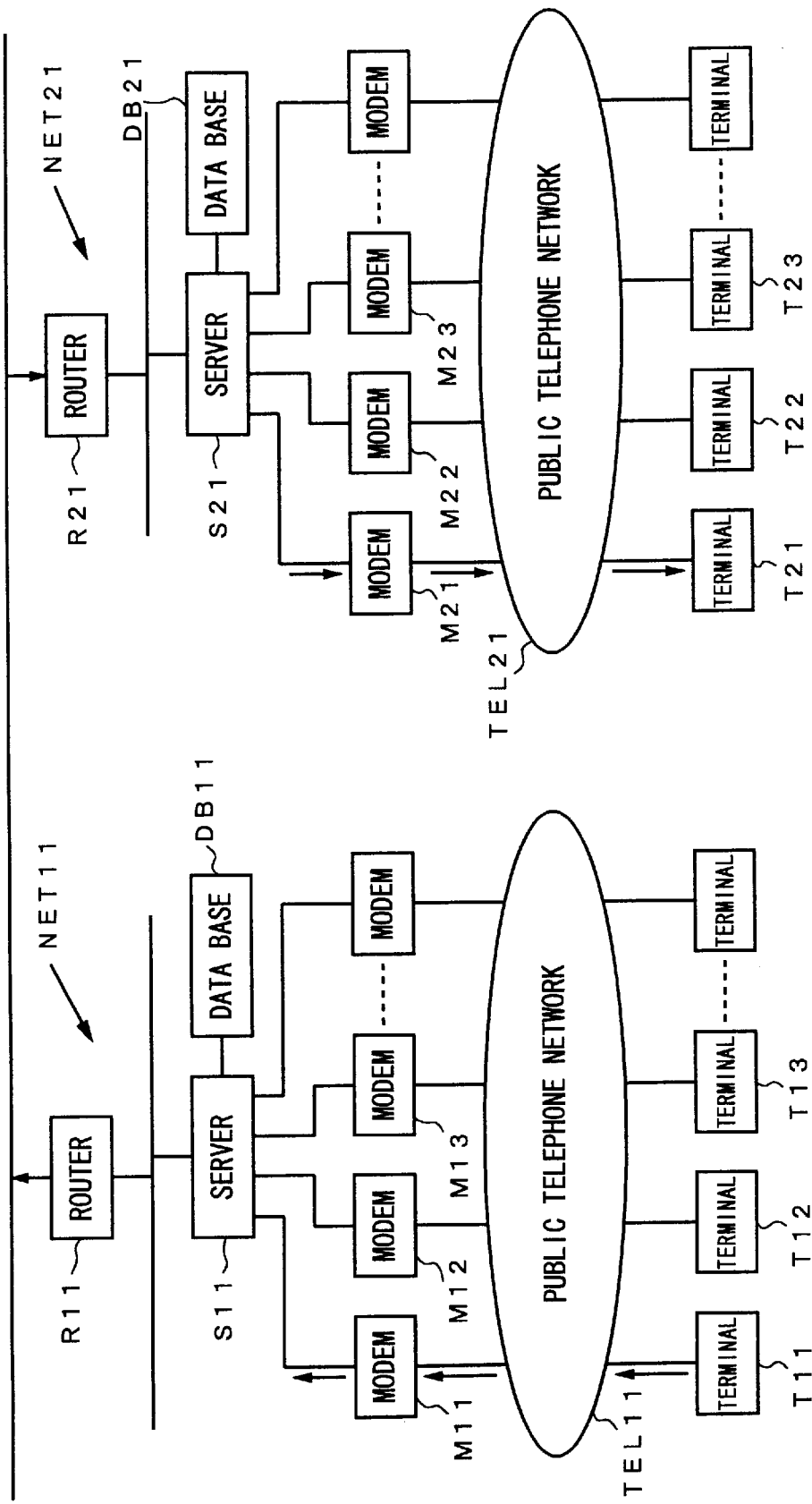
FIG. 6 is a block diagram for use in explanation of another internet telephone system to which the invention is applied.

In the above example, a terminal is connected for communication with another terminal in a common computer network. However, a terminal in a computer network can be connected for communication also with a terminal in a different computer network. FIG. 6 shows an example where terminals in different computer networks are connected for communication.

In FIG. 6, a computer network NET11 is, for example, a computer network prepared by an internet service provider. The computer network NET11 contains a server S11 and a router R11. The server S11 is connected to a public telephone network TEL11 through modems M11, M12, M13, . . . The server S11 has a data base DB11. The data base DB11 stores information containing telephone numbers of terminals connected by PPP to the computer network NET11. The computer network NET11 is connected to other computer networks forming the internet through the router R11. The router R11 routes data on the computer network to an appropriate computer network containing a destination terminal. Terminals T11, T12, T13 . . . are those of individuals personally participating the internet.

A computer network NET21 is, for example, a computer network prepared by another internet service provider. The computer network NET21 contains a server S21 and a router R21. The server S21 is connected to a public telephone network TEL21 through modems M21, M22, M23, . . . The server S21 has a data base DB21. The data base DB21 stores information containing telephone numbers of terminals connected by PPP to the computer network NET21. The computer network NET21 is connected to other computer networks forming the internet through the router R21. The router R21 routes data on the computer network to an appropriate computer network containing a destination terminal. Terminals T21, T22, T23 . . . are those of individuals personally participating the internet.

Figure 7:
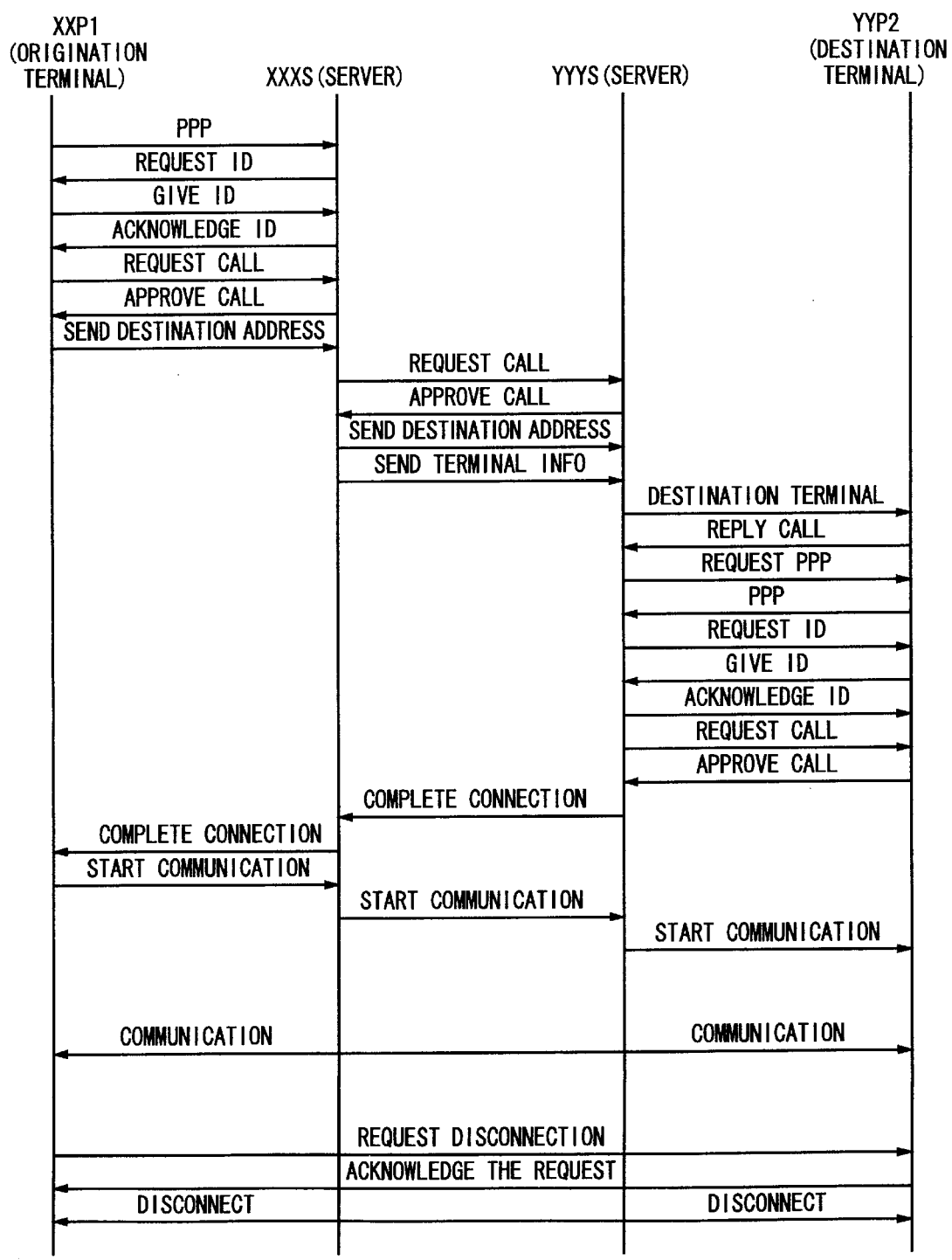
FIG. 7 is a flow chart for use in explanation of another internet telephone system to which the invention is applicable.

Assume here that the terminal T11 desires a telephone call to the terminal T12. In this case, a process is progressed as shown in FIG. 7.

First, the source terminal T11 dials the computer network NET11 of the internet service provider to call up the server S11 of the computer network NET11. Responsively, the server S11 requests the terminal T11 to enter its account code and the password for authentication whether the source terminal T11 is one of contractors of the internet service provider.

The user of the source terminal T11 answers the authentication request by entering its account code and the password. When the server S11 confirms that the entered account code and password are those of a contractor, it assigns a temporary IP address to the terminal T11. Thus, PPP connection of the terminal T11 is started.

After that, the terminal T11 sends a call request to the server S11, and the server S11 sends back a call approval. In receipt of the call approval, the terminal T11 gives a desired destination address (terminal T21, for example).

The server S11 connected to the source terminal in receipt of the destination address sends a call request for communication with the terminal T21, for example, to the server S21 of the computer network (NET21, for example) containing the destination terminal. In receipt of the call request for communication with the terminal 21, the server S21 sends back a call approval to the server S11. In receipt of the call approval, the server S11 of the network NET11 containing the source terminal sends the destination address and information on the source terminal.

The server S21 of the computer network NET21 containing the destination terminal searches into the data base DB21 to find out information on the terminal T21. The telephone number of the terminal T21 for PPP connection can be known from information of the data base DB21. The server S21 of the computer network NET21 dials the telephone number of the terminal T21 obtained from the data base DB21 to call up the terminal T21.

The destination terminal T21 accessed by the server S21 sends back an acknowledgement. The server S21 in receipt of the acknowledgement requests PPP connection, and the terminal T21 in receipt of the request for PPP connection gives confirmation of PPP connection.

The server S21 then requests entry of the account code and the password for authentication. In response to the authentication, the user of the destination terminal enters the account code and the password. When the entered account code and password are confirmed to be those of a proper contractor, an IP address is assigned to the terminal T21. Thus, PPP connection of the terminal T21 is started.

When the PPP connection is started, a call request is sent from the server S21 to the terminal T21, and a call approval is sent back from the terminal T21 to the server S21. Then, the server S21 of the computer network NET21 sends a call connection completion notice to the server S11 of the computer network NET11, and the server S11 sends a call connection completion notice to the terminal T11. As a result, audio data is exchanged for communication between the terminals T11 and T21.

When a disconnection request is issued from the source terminal T11, for example, after the communication ends, the disconnection request is sent to the destination terminal T21. In receipt of the disconnection request, the terminal T21 sends back a disconnection agreement to the terminal T11, and all connection is disconnected.

For a telephone call using the internet, audio data is transmitted in a compressed form. There are various systems for compression, and various sampling frequencies of audio data, such as 8 kHz, 10 kHz, 16 kHz, and so on, are used. As the sampling frequency becomes high, the data amount decreases, but the quality of sound becomes better. Systems using high compression rates are liable to deteriorate the quality of sound. A network takes more time to transmit data as the network becomes crowded. Therefore, while the network is crowded, it is necessary to use a lower sampling frequency for audio data and to employ a compression system with a higher compression rate in order to prevent that voice is interrupted due to a delay of transmission of the audio data. On the other hand, it is not wise to send audio data with a low sampling frequency and a high compression rate even when the network is not crowded because the quality of sound is not good.

Taking it into account, it is advisable to flexibly selecting an optimum sampling frequency and an optimum compression system, depending on the current traffic density of the network. That is, by accounting the current traffic density of the network, data is transmitted using a higher sampling frequency and a compression system promising a higher quality of sound when the network is not crowded, and using a lower sampling frequency and a compression system of a high compression rate when the network is crowded.

Figure 8:
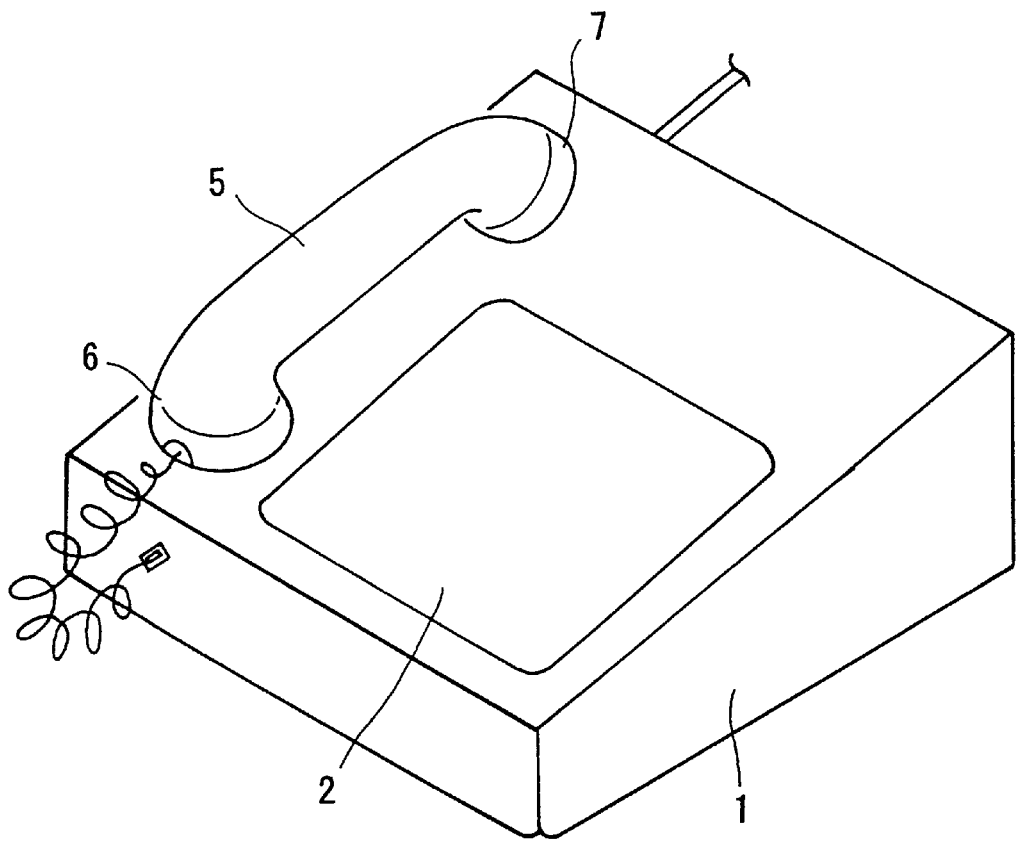
FIG. 8 is a perspective view of a telephone set in an internet telephone system to which the invention is applied.
Figure 9:
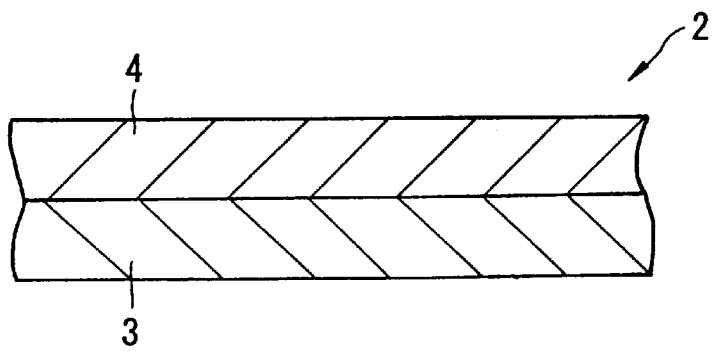
FIG. 9 is a cross-sectional view for use in explanation of a telephone set in an internet telephone system to which the invention is applied.
Figure 10:
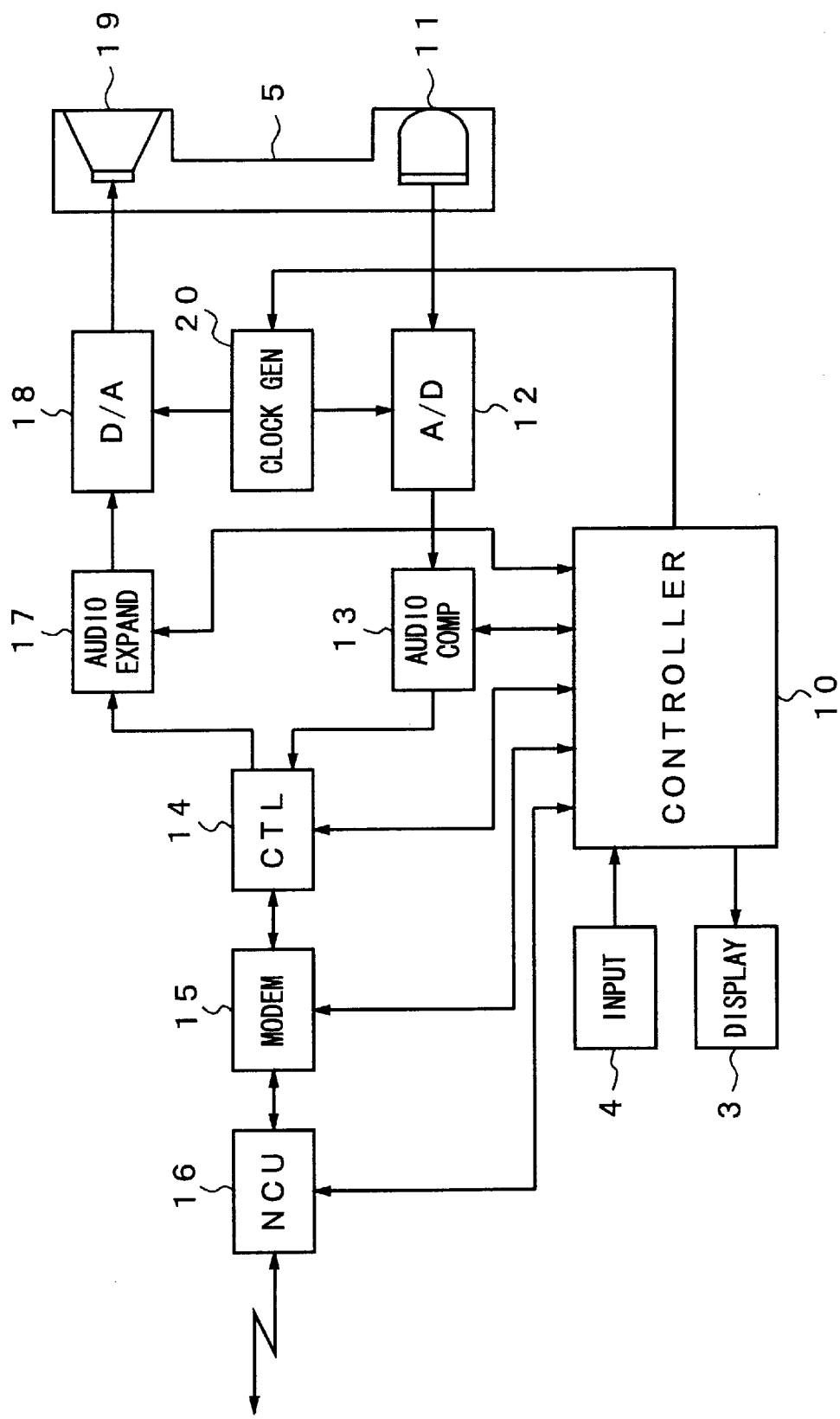
FIG. 10 is a block diagram of a telephone set in an internet telephone system to which the invention is applied.

FIGS. 8 through 10 show an internet telephone apparatus to which the invention is applied. The internet telephone apparatus accounts the traffic density of the computer network to use a high sampling frequency of data and transmit the data by a compression system using a low compression rate when the network is not crowded and to use a low sampling frequency and transmit the data by a compression system using a high compression rate.

In FIG. 8, numeral 1 denotes a telephone main body. The telephone main body 1 has a display/operator 2 on its upper surface. The display/operator 2 is a multi-layered panel including a touch panel 4 stacked on a display panel 3 as shown in FIG. 9. The display/operator 2 displays icons of numerical keys, operational keys, and so forth, which permit a user to enter a desired instruction by pressing the touch panel 4 at the portion of a corresponding icon. The display/operator 2 also displays help messages explaining how to operate the keys and the current modes of setting in addition to key icons, etc. Other various information is also displayed on the display/operator 2. A handset 5 is connected to the telephone main body 1, and the telephone main body 1 is connected to a public telephone circuit.

FIG. 10 shows the interior construction of the internet telephone apparatus to which the invention is applied. Although a controller 10, communication control circuit 14, audio compression circuit 13 and audio expansion circuit 17 are shown in separate blocks, they can be realized as software.

In FIG. 10, audio signals from a microphone of the handset 5 are supplied to an A/D converter 12. The A/D converter 12 is supplied with sampling clocks from a clock generating circuit 20. The clock generating circuit 20 can generate clocks of 4 kHz, 6 kHz, 8 kHz, 10 kHz, 12 kHz, and 16 kHz, for example. The clock frequency from the clock generating circuit 20 is controlled by the control circuit 10.

The A/D converter 12 converts the audio signal from the microphone 11 into a digital signal and supplies it to the audio compression circuit 13. The audio compression circuit 13 compresses the received signal. The audio compression circuit 13 is configured to select any one of a plurality of compression/expansion systems such as CVSD system, GSM system and others. The compression system of the audio compression circuit 13 is controlled by the controller 10.

Output from the audio compression circuit 13 is supplied to the communication control circuit 14 for communication control such as processing of data into packets. Output from the communication control circuit 14 is put on the telephone line through a modem 15 and NCU (Node Control Unit) 16 and sent to a server.

Audio data sent from the server is supplied to the communication control circuit 14 through NCU 16 and the modem 15. The communication control circuit 14 executes communication control such as decomposition of packets. Output from the communication control circuit 14 is supplied to the audio expansion circuit 17 that can employ any one of a plurality of compression/expansion systems such as CVSD system, GSM system and others under control of the controller 10.

Output form the audio expansion circuit 17 is supplied to a D/A converter 18 that is also supplied with sampling clocks from the clock generating circuit 20. As explained above, the clock generating circuit 20 can generate clocks of 4 kHz, 6 kHz, 8 kHz, 10 kHz, 12 kHz, and 16 kHz, for example under control of the controller 10. Output from the D/A converter 18 is supplied to the speaker 19 of the handset 5.

Inputs from the touch panel 4 are given to the CPU 11, and outputs from the CPU 11 are displayed on the display panel 3.

The controller 10 executes dial connection processing, processing for switching the audio compression system, and processing for switching the sampling frequency.

That is, when the controller 10 receives a destination address and other materials entered through the touch panel 4, it controls NCU 16 to dial the telephone number of the internet service provider to perform the telephone connection processing. When the telephone connection is completed, it proceeds to PPP connection processing. In some cases, a call may arrive from the internet service provider, and PPP connection is requested. Also in such cases, the controller 10 executes telephone connection processing and, after completion of telephone connection, connection processing by PPP.

Figure 11:
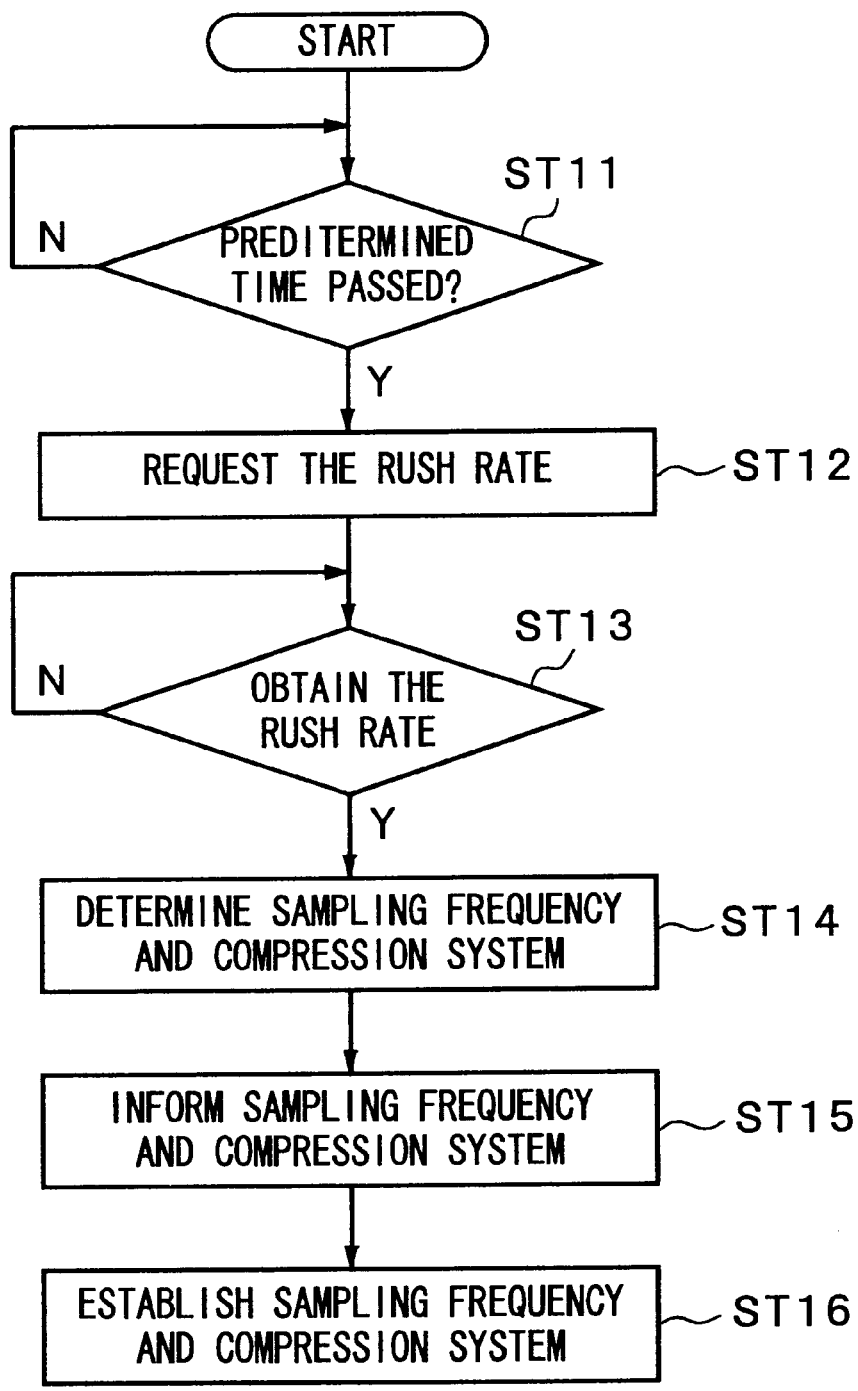
FIG. 11 is a flow chart for use in explanation of a telephone set in an internet telephone system to which the invention is applied.

Then, as shown in FIG. 11, it is judged whether a predetermined time has passed or not (step ST11). If it has passed, the server is requested to inform the traffic density of the telephone circuit (step ST12). It is reviewed whether the traffic density has been informed from the server (step ST13). If it has been informed, an optimum clock frequency and an optimum audio compression system are chosen in accordance with the traffic density (step ST14), and they are sent to the destination terminal (step ST15). According to the determined clock frequency and audio compression system, the clock frequency of the clock generating circuit 20 and the compression system of the audio compression circuit 13 and the audio expansion circuit 17 are established (step ST16).

Figure 12:
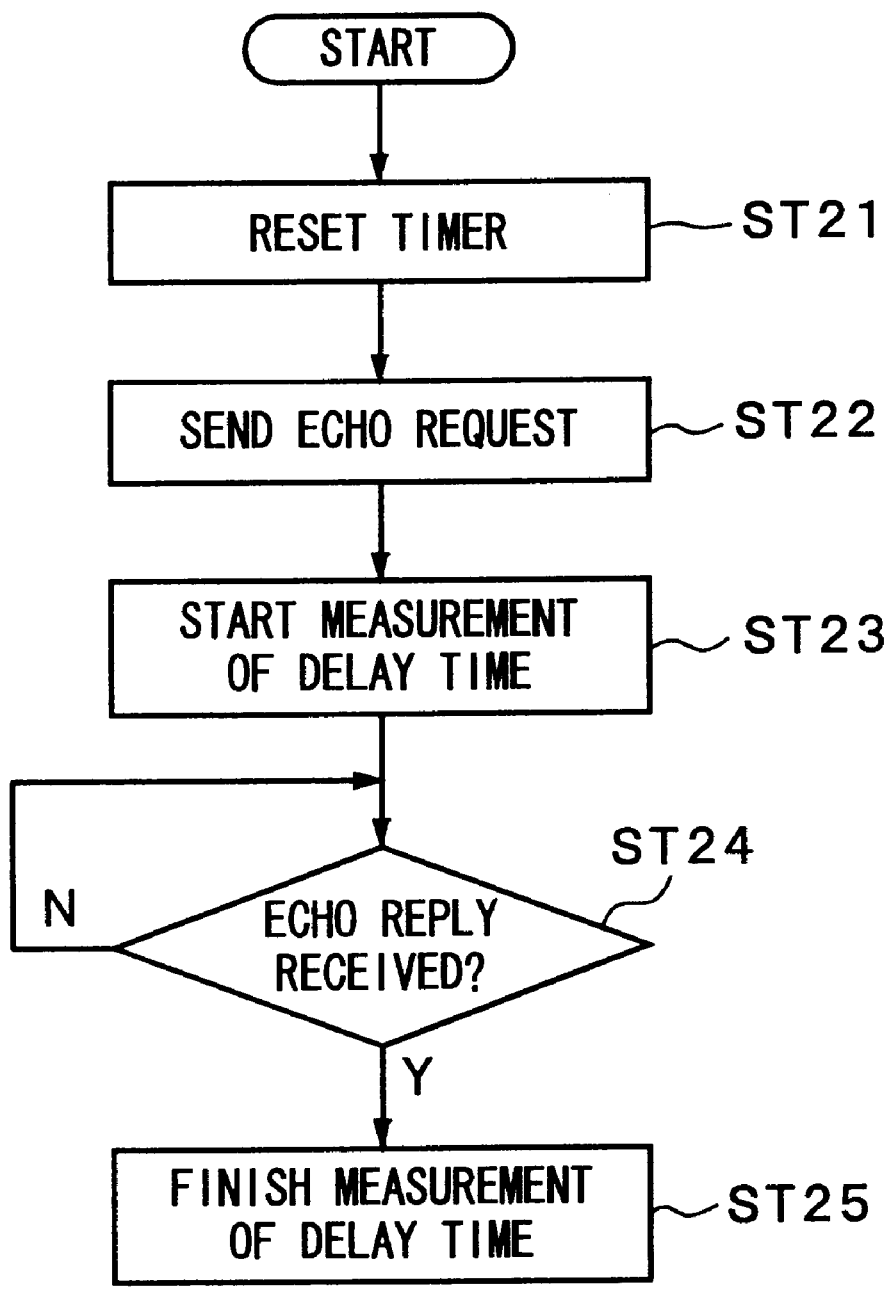
FIG. 12 is a flow chart for use in explanation of a telephone set in an internet telephone system to which the invention is applied.

The server judges the traffic density of the telephone circuit in a process as shown in FIG. 12, for example.

In FIG. 12, a delay measuring timer is reset (step ST21). After an echo request is sent to the server of a destination terminal (step ST22), the delay measuring timer restart its counting action (step ST23) to measure the delay time required until an echo reply answering the echo request reaches (step ST24), and then stops the measurement (step ST25).

The delay time required after despatch of the echo request until arrival of the echo reply reflects the traffic density of the telephone circuit, namely, the ratio of use of the telephone circuit. A long delay time represents that the telephone circuit is crowded and the ratio of use of the telephone circuit is high.

The traffic density of the telephone circuit can be known also by using a control packet and measuring the delay time between servers in lieu of measuring the delay time from despatch of the echo request to arrival of the echo reply. It is also possible to use a Ping command between connected terminals to measure the delay time.

According to the invention, the sampling frequency of the audio compression circuit and the compression system of the audio compression circuit can be flexibly set to optimum values according to the traffic density of the computer network system. Therefore, a good quality of sound is ensured, and voice is not interrupted during telephone conversation even when the computer network system is crowded.

What is claimed is:

1. A telephone apparatus of a telephone system including first and second servers for connecting a plurality of telephone apparatuses connected to a computer network, comprising:

communication circuit means for processing data to and from said computer network;

audio input means for generating a digital audio signal from input voice by using an optimum one of a plurality of sampling frequencies;

audio compression means for compressing said digital audio signal generated by said audio input means by using an optimum one of a plurality of compression systems and for supplying the compressed audio signal to said communication circuit means;

traffic density measuring means for measuring a traffic density of said computer network by having said first server send an echo request to said second server and measuring a delay time for receiving an echo reply; and control means for selecting said optimum one of said plurality of a sampling frequencies for said audio input means and for selecting said optimum one of said plurality of compression systems for said audio compression means in response to said traffic density of said computer network measured by said traffic density measuring means.

2. The telephone apparatus according to claim 1, wherein said audio compression means includes a variable frequency clock generator for supplying sampling clocks to said audio input means, and said control means selects a frequency corresponding to said sampling clocks from said clock generator in response to information on said amount of congestion.

3. The telephone apparatus according to claim 1, wherein said control means selects a compression system to be used in said audio compression means in response to information on said amount of congestion.

4. A telephone apparatus connectable to a computer network including first and second servers and for transmitting data containing audio data, comprising:

communication circuit means for processing data to and from said computer network;

audio input means for generating a digital audio signal from input voice by using an optimum one of a plurality of sampling frequencies;

audio compression means for compressing said digital audio signal generated by said audio input means by using an optimum one of a plurality of compression systems and for supplying the compressed audio signal to said communication circuit means;

traffic density measuring means for measuring a traffic density of said computer network by having said first server send an echo request to said second server and measuring a delay time for receiving an echo reply;

control means for selecting said optimum one of said plurality of sampling frequencies for said audio input means and for selecting said optimum one of said plurality of compression systems for said audio compression means in response to said traffic density of said computer network measured by said traffic density measuring means and for sending data compressed by using said optimum one of said plurality of compression systems onto said computer network through said communication circuit means;

audio expansion means supplied with another compressed digital audio signal received through said communication circuit means for expanding said other compressed digital audio signal; and audio output means for generating a voice output from an output of said audio expansion means.

* * * * *